(12) United States Patent
Salo

(10) Patent No.: US 7,688,845 B2
(45) Date of Patent: Mar. 30, 2010

(54) METHOD AND ARRANGEMENT OF ARRANGING TRAFFIC IN TELECOMMUNICATIONS SYSTEM

(75) Inventor: Kaj Salo, Helsinki (FI)

(73) Assignee: ABB Oy, Helsinki (FI)

( * ) Notice: Subject to any disclaimer, the term of this patent is extended or adjusted under 35 U.S.C. 154(b) by 782 days.

(21) Appl. No.: 11/097,320

(22) Filed: Apr. 4, 2005

(65) Prior Publication Data

US 2005/0169299 A1    Aug. 4, 2005

Related U.S. Application Data

(63) Continuation of application No. PCT/FI2004/000149, filed on Mar. 16, 2004.

(30) Foreign Application Priority Data

Mar. 17, 2003    (FI) ................................. 20030397

(51) Int. Cl.
*H04L 12/413*    (2006.01)

(52) U.S. Cl. .................. 370/445; 370/498; 370/230; 370/252; 370/282; 370/294; 370/463

(58) Field of Classification Search ................ 370/230, 370/252, 282, 294, 348, 436, 437, 443, 445, 370/458, 462, 463, 468
See application file for complete search history.

(56) References Cited

U.S. PATENT DOCUMENTS 4,471,481 A * 9/1984 Shaw et al. ................. 370/450
4,516,239 A * 5/1985 Maxemchuk ............... 370/445
4,987,571 A * 1/1991 Haymond et al. ........... 370/445
5,426,638 A * 6/1995 Maruyama et al. .......... 370/450
6,160,795 A * 12/2000 Hosemann ................... 370/256
6,321,272 B1   11/2001 Swales
6,868,459 B1 * 3/2005 Stuber .......................... 710/35
7,009,996 B1 * 3/2006 Eddy et al. .................. 370/463
7,277,450 B2 * 10/2007 Neeley et al. ............... 370/420
7,321,580 B1 * 1/2008 Ramanathan et al. ....... 370/339

FOREIGN PATENT DOCUMENTS

| EP | 1 178 632 | 2/2002 |
|---|---|---|
| GB | 2 292 048 | 2/1996 |
| WO | 83/03328 | 9/1983 |
| WO | 03/052980 | 6/2003 |

* cited by examiner

*Primary Examiner*—Jason E Mattis
*Assistant Examiner*—Kibrom T Hailu
(74) *Attorney, Agent, or Firm*—Dykema Gossett PLLC; Adesh Bhargava; Timothy K. Sendek

(57) ABSTRACT

A method and arrangement in a telecommunications system comprising a data transmission path (8), the arrangement comprising devices (1, 21, 221 to 22n) and data being transmitted on the data transmission path between the devices in messages (4, 9) cyclically, whereby one or more of the devices (1, 221 to 22n) are arranged, during one or more first turns, respectively, to set the timing of their own cyclic traffic between cyclic traffic detected on the data transmission path; and one or more of the devices (1, 21, 221 to 22n) are arranged, during a second turn, to transmit a message not belonging to the cyclic traffic to the data transmission path on the basis of at least one determined occurrence time slot of the cyclic traffic such that the message does not collide with messages of the cyclic traffic which occur in the determined at least one occurrence time slot.

8 Claims, 1 Drawing Sheet

METHOD AND ARRANGEMENT OF ARRANGING TRAFFIC IN TELECOMMUNICATIONS SYSTEM

CROSS-REFERENCE TO RELATED APPLICATION

This application is a continuation of PCT/FI2004/00149, filed Mar. 16, 2004.

BACKGROUND OF THE INVENTION

The invention relates to a method and an arrangement for arranging traffic in a telecommunications system, and particularly in a telecommunications system wherein data is transmitted cyclically.

An example of a telecommunications system wherein data transmission takes place cyclically according to certain cycle times is a common industrial automation system comprising a programmable logic controller (PLC or a "SoftPLC", which refers to replacing an execution unit of the programmable logic with an application program to be run in a computer to execute commands of the logic program), related actuators and sensors or other devices and a bus connecting the same, e.g. a Profibus or the like. Typically, the internal telecommunication of such a system is cyclic such that the transmitter of data, e.g. a PLC, transmits a certain (same) message at certain intervals according to a corresponding cycle time, in other words a cycle time refers to a time between the starting moments of the transmission of two such successive messages. The message is delivered to a device connected to the bus, and the device typically replies by transmitting a reply message. When the cycle time is sufficiently short, in practice data may thus be transferred in real time e.g. between a PLC and an actuator, so that e.g. the real-time state information or the like of the actuator is available to the PLC. Such cycles usually occur several at the same time, each cycle having a certain cycle time. The cycle times of different cycles may differ from one another or they may be equal in length. Furthermore, in such a system, a message cycle is usually always initiated by a device operating as a master, such as a PLC, while other devices (slave devices) only reply to the messages received from the master device. In such a case, each message cycle has a predetermined transfer time on a data transmission path, thus enabling collisions between different messages, i.e. simultaneous transmissions on to the data transmission path, to be prevented.

In some processes, however, a need also exists to communicate from one slave device to another, i.e. slave-to-slave communication is needed. Typically this takes place through a master device such that the master device asks a first slave device for the necessary information and writes the received reply to a second slave device. A problem with the above-described solution is that such a procedure unnecessarily consumes the capacity of the data transmission path used as well as the processor capacity of the master device since communication between slave devices always takes place through a master device.

BRIEF DESCRIPTION OF THE INVENTION

An object of the invention is thus to provide a method and a device implementing the method so as to enable the aforementioned problem to be solved or at least alleviated. The object of the invention is achieved by an arrangement and a method that are characterized by what has been disclosed in independent claims 1 and 7. Preferred embodiments of the invention are disclosed in the dependent claims.

The invention is based on the idea that one or more devices using a data transmission path for data transmission may carry out traffic of their own on the data transmission path. Traffic, such as a message cycle, initiated by a particular device itself is herein generally referred to as its own traffic. The invention is further based on the idea that one or more devices using a data transmission path for data transmission and having a need to carry out cyclic traffic of their own on the data transmission path are arranged to monitor in their turns, during one or more first turns, respectively, the cyclic traffic of the data transmission path in the telecommunications system, and to set the timing of their own cyclic traffic on the data transmission path between cyclic traffic detected based on the monitoring; and that one or more of the devices using the data transmission path for data transmission and having a need to carry out non-cyclic traffic of their own on the data transmission path are arranged, during a second turn, to monitor the cyclic traffic on the data transmission path of the telecommunications system, to determine, on the basis of the monitoring and the cycle time of the at least one cycle of the cyclic traffic, at least one expected occurrence time slot of the cyclic traffic, and to transmit a message that does not belong to the cyclic traffic to the data transmission path on the basis of at least one determined occurrence time slot of the cyclic traffic such that the message does not collide with one or more messages of the cyclic traffic which occur in the determined at least one occurrence time slot.

An advantage of the method and system of the invention is that according to the invention, one or more devices producing cyclic traffic, e.g. a slave or another master device, may set their own cyclic traffic on the data transmission path and utilize the redundant data transmission capacity left over from the rest of the cyclic traffic on the data transmission path. In a normal state of the system, wherein cycle times are substantially constant, the occurrence time slots of cyclic traffic may be determined with great certainty and thus interleave a device own traffic between the cyclic traffic already occurring on the data transmission path. Furthermore, in addition to the cyclic traffic produced by one device (e.g. a master), other cyclic traffic may be transferred on the data transmission path such that the cyclic traffic already occurring on the data transmission path is interfered with as little as possible or not at all. A further advantage of the invention is that one or more devices, e.g. a switch or a router or a slave or another master device delivering non-cyclic traffic to the data transmission path, may utilize the redundant data transmission capacity left over from the cyclic traffic on the data transmission path. Furthermore, non-cyclic traffic may be transmitted on the data transmission path such that the cyclic traffic occurring on the data transmission path is interfered with as little as possible or not at all.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
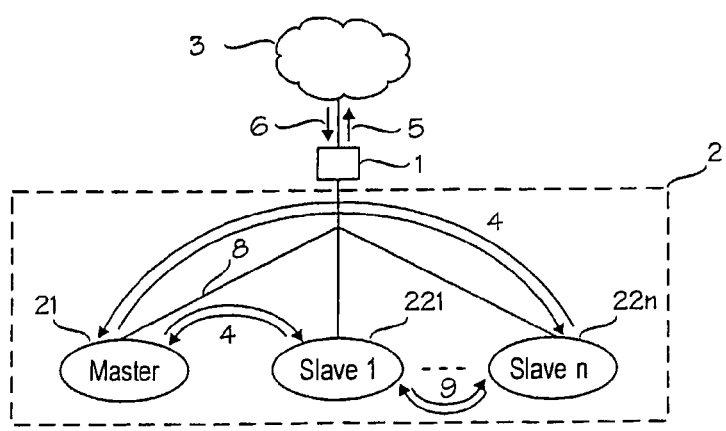
FIG. 1 is a block diagram showing a telecommunications system whereto the invention may be applied.

FIG. 1 shows a telecommunications system comprising a telecommunication network 2, which is e.g. an automation system and which further comprises a master unit 21 and n slave units 221 to 22n that are interconnected through a data transmission path 8. In the following, devices like 1, 21 and 221 to 22n do not necessarily refer to separate physical devices but they may also be separate software units in connection with the same physical device or devices. The data transmission path 8 may be a wired transmission path, e.g. a bus used in automation systems, or a wireless transmission path, such as a radio path. The master unit 21 is e.g. a programmable logic controller PLC while the slave units 221 to 22n are actuators and sensors or other devices related thereto. The internal data transmission of the network 2, i.e. the data transmission between units 21 and 221 to 22n, operates cyclically such that a message cycle 4 is initiated by the master unit 21 while the other units 221 to 22n reply to the messages received from the master unit 21, as is illustrated in the figure by arrows 4 and as described already in the general part of the description. Each message cycle 4 then has a predetermined transfer time on the data transmission path 8, enabling collisions between different messages, i.e. simultaneous transmissions on to the data transmission path, to be prevented. In the example of FIG. 1, the network 2 is further connected to an intermediation device 1, which may be e.g. a router or a switch or another network device. Through the intermediation device 1, the network 2 is connected to other systems 3, such as to other data communications networks, another automation system or e.g. to the Internet. Such a connection of the network 2 to other systems 3 may also be omitted altogether and it is irrelevant to the basic idea of the invention. The functionality of the invention is preferably implemented in one or more devices 1, 221 to 22n connected to the network 2 and it may preferably be implemented by software by means of a processor and appropriate software or, alternatively, by separate components or circuits. If the device at issue is e.g. a slave unit, a router or a switch or a corresponding network device in an automation system, the functionality of the invention may be added thereto e.g. in the form of a suitable software update. It is to be noted that the figures only show elements relevant to the understanding of the invention and the application of the invention is by no means restricted to the disclosed systems.

According to the invention, one or more devices 1, 221 to 22n are arranged to monitor in their turns, during one or more first turns, respectively, the cyclic traffic of the data transmission path 8 in the telecommunications system, and to set the timing of their own cyclic traffic on the data transmission path between cyclic traffic detected on the basis of the monitoring. Furthermore, according to the invention, one or more of the devices 1, 221 to 22n are arranged, during a second turn, to monitor the cyclic traffic of the data transmission path in the telecommunications system 8, to determine, on the basis of the monitoring and the cycle time of the at least one cycle of the cyclic traffic, at least one expected occurrence time slot of the cyclic traffic, and to transmit a message that does not belong to the cyclic traffic to the data transmission path on the basis of at least one determined occurrence time slot of the cyclic traffic such that the message does not collide with one or more messages of the cyclic traffic which occur in the determined at least one occurrence time slot. Traffic, such as a message cycle, initiated by a particular device itself is herein generally referred to as its own traffic. When traffic refers to a message cycle, a device other than the one that initiated the cycle typically replies to the message that started the cycle, but such a reply message may be considered as belonging to the traffic of the device that initiated the cycle or it may be considered as a message of its own to be analyzed as such. For instance in FIG. 1, the cyclic traffic 4 takes place initiated by the master unit 21 while traffic designated by number 9 takes place initiated by some slave unit 221 to 22n, in which case the traffic designated by number 9 is some slave unit's 221 to 22n own traffic and the traffic designated by number 4 is the master unit's 21 own traffic. Reply messages may also be processed as separate messages of their own.

For instance, in addition to one master unit 21, the system of FIG. 1 includes one or more devices 1, 221 to 22n which have a need to carry out traffic of their own which is no conventional cyclic traffic initiated by the master unit 21. According to the invention, devices that possibly have a need to carry out cyclic traffic of their own arrange, by turns, each during its first turn, their own cyclic traffic on to the data transmission path 8 between the traffic already occurring thereon. In a normal state of the system, wherein cycle times are substantially constant, the occurrence time slots of the cyclic traffic may be determined with great certainty and thus a device's own traffic may be interleaved between the cyclic traffic already occurring on the data transmission path. Furthermore, devices that possibly have a need to carry out non-cyclic traffic of their own are arranged to monitor, during a second turn, the cyclic traffic of the data transmission path 8 in the telecommunications system, to determine, on the basis of the monitoring and the cycle time of the at least one cycle of the cyclic traffic, at least one expected occurrence time slot of the cyclic traffic, and to transmit a message that does not belong to the cyclic traffic to the data transmission path 8 on the basis of at least one determined occurrence time slot of the cyclic traffic such that the message does not collide with one or more messages of the cyclic traffic which occur in the determined at least one occurrence time slot. In other words, the device 1, e.g. a switch or a router, which delivers traffic 6 coming elsewhere 3 to the data transmission path 8, may utilize the redundant data transmission capacity left over from the cyclic traffic 4 and 9 on the data transmission path. Alternatively, some of the devices 21, 221 to 22n may transmit non-cyclic information, such as alarms, etc., either to other devices of the data transmission path 8 or through the device 1 to higher/other parts of the automation system, thus utilizing the redundant data transmission capacity left over from the cyclic traffic 4 and 9 on the data transmission path. When operating according to the invention, it is highly probable that collisions between non-cyclic traffic and cyclic traffic can be avoided. Instead, messages of non-cyclic traffic transmitted by the devices 1, 21, 221 to 22n may collide with one another since the occurrence of coming non-cyclic traffic on the data transmission path 8 cannot be foreseen. However, a collision between messages of the non-cyclic traffic is not a problem since non-cyclic traffic is typically not time-critical but is, nevertheless, connection-oriented. Such a connection-orientedness ensures a successful delivery of data since the device that generated the traffic retransmits the data if it does not receive an acknowledgement from the receiver. According to a preferred embodiment of the invention, the aforementioned second turn is arranged to begin after the one or more first turns, i.e. one or more devices 1, 221 to 22n producing cyclic traffic may first set their own cyclic traffic on the data transmission path 8 and, after this, one or more devices that deliver non-cyclic traffic to the data transmission path may utilize the redundant data transmission capacity left over from the cyclic traffic on the data transmission path.

Figure 2A:
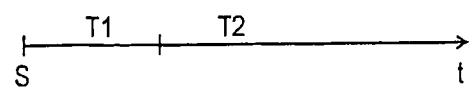
FIGS. 2A and 2B show how turns occur in terms of time according to preferred embodiments of the invention.
Figure 2B:
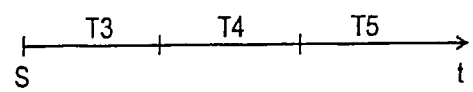

In the above-described embodiments of the invention, the devices 1, 221 to 22n are preferably arranged to initiate their turns gradually in terms of time, starting from a predetermined starting moment. In other words, e.g. one or more of the slave devices 221 to 22n first, during their own determined turn, set their own traffic on the data transmission path 8 such that a particular starting time has preferably been predetermined for the turn of each device, starting from a determined starting moment, e.g. from the activation moment of the bus 8. Furthermore, the turn is preferably provided with a predetermined length in time. Such a length may be e.g. 10 s, but it is to be noted that an appropriate length of a turn depends on the system to which the invention is applied; the invention is thus not restricted to any particular length of a turn. The length of a turn should preferably be long enough for the device at issue to have enough time to set its own traffic on the bus 8 during its turn, as well as long enough for other devices analyzing the cyclic traffic to have enough time to determine the occurrence time slots of the cyclic messages set on the bus by the device currently having a turn with a sufficient accuracy. By means of a time line, FIG. 2A illustrates a case wherein starting from a starting moment S, a turn T1 is first provided e.g. for some slave device 221 to 22n to set its own cyclic traffic on the transmission path 8 and next, a turn T2 starts, enabling one or more devices 1, 221 to 22n to set their own non-cyclic traffic between the cyclic traffic 4 and 9 and thus to utilize the redundant data transmission capacity left over from the cyclic traffic on the data transmission path. In this case, no particular length has been predetermined for the turn T2. By means of a time line, FIG. 2B illustrates a case wherein starting from a starting moment S, a turn T3 is first provided e.g. for a slave device 221 to 22n to set its own cyclic traffic on the transmission path 8 and next, a turn T4 is provided e.g. for another slave device 221 to 22n to set its own cyclic traffic on the transmission path 8. Next, a turn T5 begins, enabling one or more devices 1, 221 to 22n to set possible non-cyclic traffic of their own between the cyclic traffic 4 and 9. Between the turns there may also be provided an interval of an arbitrary length, although in the examples shown in FIGS. 2A and 2B the turns follow one another substantially immediately.

Alternatively, the devices may preferably be arranged to notify the rest of the devices that their turn has ended, and to start their own turn in response to such a notification from a device having the previous turn. Hence, the devices 1, 221 to 22n may e.g. have a predetermined order and a corresponding queue number indicating when each device is to start its own turn upon receiving a notification from a precedent device according to the order, indicating the end of its turn.

In the above-described embodiments of the invention, one or more of the devices 1, 221 to 22n preferably monitor in their turn the internal traffic 4 of the network 2 on the data transmission path 8. One or more of the devices 1, 221 to 22n also preferably analyzes the traffic and stores the analysis results in their memory. Furthermore, one or more of the devices 1, 221 to 22n preferably follow the realization of the analysis results and modify them if the traffic changes, i.e. the traffic is preferably analyzed continuously. Traffic 6 coming from outside the network 2 is preferably first buffered to the intermediation device 1. After noticing, on the basis of analysis information, that there is a sufficient pause in the internal traffic of the network 2, the intermediation device 1 transmits a buffered message to the data transmission path 8 in the network 2. As far as the network 2 is concerned, outgoing traffic 5 from the network 2 may be forwarded immediately.

The internal traffic of the network 2 is thus cyclic. It is transmitted e.g. by a process in the master unit 21 or in the slave devices 221 to 22n. Normally, the process delivers the data to be transmitted to a protocol stack. The protocol stack also usually operates cyclically. Since the device 1, 221 to 22n connected to the transmission path 8 hears all messages from the transmission path, it is possible for the device to analyze e.g. the cycle times and occurrence moments of the cyclic data on the transmission path mathematically.

The cycle time or cycle times of the internal traffic of the network 2 may be fed to one or more devices 1, 221 to 22n or, alternatively, the device itself may determine the cycle time or cycle times. If the cycle times are fed to the device 1, 221 to 22n, it is also preferable to provide it e.g. with the cycle time of the protocol stack, if one exists. When the cycle times are fed to the device 1, 221 to 22n, it does thus not have to carry out mathematical calculation in order to find out the cycle time or cycle times. In such a case, the devices 221 to 22n which produce cyclic traffic of their own only monitor the timing of the cycles already occurring on the transmission path 8 and set the timing of the cycles of their own traffic such that the cycles to be added to the transmission path do not overlap with the cycles already occurring on the transmission path. The router device 1 or e.g. a slave device 221 to 22n which utilizes the redundant capacity left over from the cyclic traffic on the transmission path 8, in turn, e.g. by means of mathematical examination, has to anticipate an occurrence time slot or occurrence time slots on the bus 8 of the cyclic traffic to enable the device to set its own traffic between the cyclic traffic occurring on the bus, as described above.

When the device 1, 221 to 22n itself has to determine the cycle times of the traffic on the bus 8, it is also then possible to feed the cycle time of the operation of a possible protocol stack to the device 1, 221 to 22n (or information indicating that the protocol stack has no cycle time but the process itself that uses the data transmission starts the protocol stack) or the device itself may also determine its cycle time.

When the device 1, 221 to 22n itself, based on past events, has to determine the cycle time of the data transmission of the internal traffic, the following assumptions are preferably used:

Usually the cycle time is not an indefinite number, e.g. 29.38 ms, but it is typically an even round figure, such as 50 ms.

In a normal process situation, the cycle time does not change but remains substantially constant.

In a normal process situation, the system tries to settle in a stabile state, i.e. the changes occurring in the system are not continuous but occur occasionally. Such changes may occur e.g. when two different processes, the cycle time of the slower one being a multiple of the faster, communicate to the external world, in which case the mutual order of the messages transmitted by these processes on the bus 8 may change occasionally, but the messages of the process having a slower cycle time may also be delayed from the anticipated cycle time. However, these phenomena do not affect the cycle time itself; instead, they affect the occurrence moment of the data on the bus 8.

The cycle time or times are preferably determined such that the device 1, 221 to 22n monitors the traffic of the bus 8 and follows each message cycle, simultaneously sampling the times between successive messages of each message cycle, i.e. more precisely, the times between the starting moments of successive messages. When a sufficient number of samples have been collected from a particular cycle, the average value of the samples approaches the real cycle time of the particular cycle. When the above-disclosed assumptions are also taken into account, the cycle time of the cycle may thus be found out. If several cycles are in progress, the cycle time of each cycle is preferably determined.

If the device 1, 221 to 22n has to determine the cycle time of a protocol stack, the message having the most frequent cycle is preferably used in the calculation. Its standard deviation should be close to the cycle time of the protocol stack divided by two. What applies to the cycle time of processes usually also applies to this cycle time as well, i.e. it is an even round figure. It is also possible to conclude from the obtained value whether or not the protocol stack resides in its own process. If the value is small, the protocol stack is not in its own process. When the value is real, it is preferably rounded to the closest even round figure, e.g. 50 μs. If the value is nowhere close to an even round figure, the sampling is continued and the calculation is repeated. The obtained value may be used for checking the calculations.

The predetermination of a coming occurrence time slot or coming occurrence time slots on the bus 8 of the cyclic traffic preferably carried out by the devices 1, 221 to 22n may be based on the assumption that the occurrence moment of the message of a particular cycle from a previous occurrence follows a normal distribution. An alternative is to use the cycle time of the protocol stack as a range of variation if such a cycle time exists. To this cycle time, however, a variable x is to be added, the value of such a variable increasing when the number of faster cycle times increases.

Another alternative is to use normal estimators of a normal distribution:

$$Z = \frac{\overline{X} - \mu}{\sigma/\sqrt{n}} \sim N(0,1), \qquad (1)$$

wherein $\sigma = \sqrt{s^2}$ i.e. the square root of a sample variance, $\overline{X}$ is a sample mean value, and
n is the sample size used.
The sample variance is obtained from equation:

$$s^2 = \frac{1}{n-1}\left[\sum_{i=1}^{n} x_i^2 - \frac{i}{n}\left(\sum_{i=1}^{n} x_i\right)^2\right]. \qquad (2)$$

$\overline{X}$, in turn, is obtained from equation:

$$\overline{X} = (x_1 + x_2 + x_3 + \ldots + x_n)/n. \qquad (3)$$

For instance, when the router device 1 is provided with a probability P which it is to use, a time slot may be calculated wherein the message of the cyclic traffic should occur. After this time slot has started, i.e. after it has become active, no external messages 6 are preferably allowed onto the bus 8. After the message of the cyclic traffic has passed, other messages may preferably be allowed onto the bus. For this, the predetermined time slot of the message of the cyclic traffic is preferably cancelled, i.e. it becomes non-active, when the related message has passed on the bus, even if the time reserved for the time slot had not exhausted. A message 6 of external traffic may thus be allowed onto the bus 8 as soon as the time slot of the message of the cyclic traffic is cancelled; or all current active time slots are cancelled if more than one active time slot exists. A prerequisite is thus that no time slot of the cyclic traffic occurs active, i.e. the transmission of a message not belonging to the cyclic traffic to the bus 8 is preferably started at the earliest only after all current active time slots of the cyclic traffic are cancelled. Furthermore, the message not belonging to the cyclic traffic is transmitted to the data transmission path 8 preferably such that the transmission of the message on the data transmission path ends before the start of a next determined coming occurrence time slot of the cyclic traffic. In some bus types, such a timing of message interleaving before the start of the interleaving of a next message may be a property of the bus 8 itself, in which case the router device 1 may ignore it. The probability P is preferably selected such that when the amount of traffic is small, a larger probability P may be used since redundant time for external traffic is available anyhow. A larger probability P decreases the risk of collisions. With a large amount of traffic, in turn, a smaller probability P has to be used since few available time slots are left over for the external traffic. This nevertheless increases the risk of collisions. An appropriate default value that can be changed when necessary is preferably used for the probability P. An occurrence time slot μ may be calculated in the following manner, for example:

$$\overline{X} - Z_?\sigma/\sqrt{n} - K \leq \mu \leq \overline{X} + Z_?\sigma/\sqrt{n} + \text{timeout} - K, \qquad (4)$$

wherein $Z_?$ is a table value of the normal distribution of the given probability and ? is obtained from equation:

$$? = 1 - (1-P)/2. \qquad (5)$$

Figure 3:
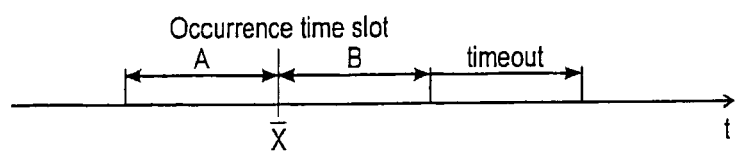
FIG. 3 is a diagram showing an occurrence time slot of a message according to an embodiment of the invention.
Figure 4:
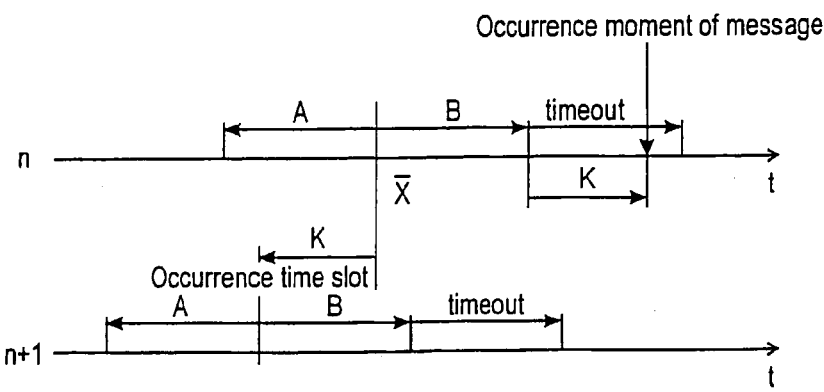
FIG. 4 is a diagram showing a transfer of an occurrence time slot of a message according to an embodiment of the invention.

In equation 4, the timeout value should be at least equal to the running time of the processes having a higher priority. By means of a time line, FIG. 3 illustrates an occurrence time slot μ such that the left-hand side of equation 4 is designated by a letter A and the right-hand side without parameters timeout and K by a letter B, the middle point thereof being $\overline{X}$. The time line also shows a timeout sequence. Parameter K included in equation 4 is a correction parameter to enable the realized occurrence moments to be taken into account and deviations therein to be corrected as compared with previous analysis results. K is the interval of a previous performance time subtracted by a function of the time slot without timeout. In other words, if the performance interval does not fall within the time slot A+B, the difference is subtracted preferably from the next expected occurrence time since the mean value of the performance intervals is usually within a couple of percents of the programmed one when the sample size is ten or more. When the occurrence moment of a message falls within the time slot A+B, the value of K is zero. This is illustrated in FIG. 4 wherein the occurrence of a time slot n and a following time slot n+1 is shown on two time lines. The time lines are placed on top of one another such that the lower time line corresponds to the upper one with the cycle time of the message under examination added thereto. The upper time line shows the realized occurrence moment of the message, which falls within the timeout sequence. The value of K is thus the time between the time slot A+B and the real occurrence moment of the message, as is shown in the figure, and the next time slot n+1 correspondingly moves earlier by the magnitude of K. Only one possible example is shown above for determining a coming occurrence time slot or coming time slots of the cyclic traffic 4 on the bus 8 but it is clear that methods of different kind may also be used without deviating from the basic idea of the invention.

Figure 5:
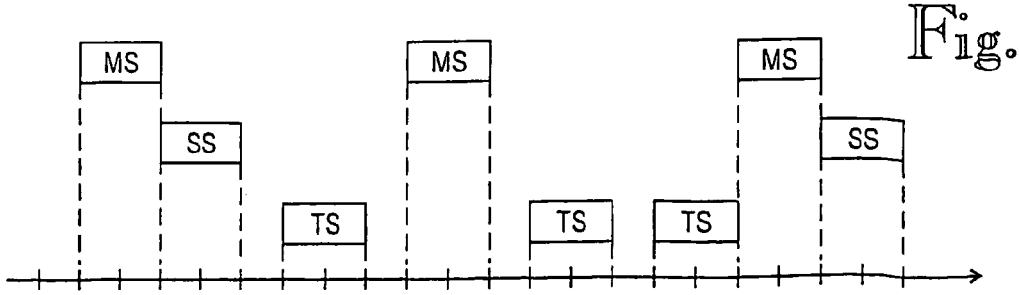
FIG. 5 shows communication of devices connected to a data transmission path according to an embodiment of the invention.

By way of example and by means of a time line, FIG. 5 illustrates communication of devices connected to a transmission path 8 on the transmission path. Time slots used by the cyclic traffic of a master device 21, which in this example comprises one message cycle, are designated as MS. In other words, the time slot MS of the message cycle of the master device 21 occurs regularly on the transmission path 8 according to its cycle time. Furthermore, time slots used by the cyclic traffic of a slave device 221 to 22n are designated as SS. The slave device 221 to 22n has thus, according to the invention, set the timing of the occurrence time slots SS of the traffic cycle of its own cyclic traffic, which in the present example comprises one message cycle, between the occurrence time slots MS of the already existing traffic, i.e. in this case the traffic of the master device. The figure further shows time slots TS used by the traffic of a router device 1. In accordance with what has been disclosed above, the router device 1 uses the redundant capacity left over from the time slots MS and SS of the cyclic traffic and thus sets the occurrence time slots TS of its own traffic between the time slots MS and SS. It is to be noted that for the sake of simplicity, the figure only shows one traffic cycle for the master device and the slave device although it is clear that there may be an arbitrary number thereof. Furthermore, for instance the length of the occurrence time slots MS, SS and TS may vary although the figures, for the sake of clarity, show them substantially equal in length.

It is obvious to one skilled in the art that as technology advances, the basic idea of the invention may be implemented in many different ways. The invention and its embodiments are thus not restricted to the above-described examples but may vary within the scope of the claims.

The invention claimed is:

1. An arrangement in connection with a telecommunications system comprising a data transmission path, the arrangement comprising devices using the data transmission path for data transmission, data being transmitted on the data transmission path between the devices in messages cyclically according to at Least one cycle having a substantially constant cycle time, wherein
one or more of the devices are configured to:
monitor in their turns during one or more first turns, respectively, the cyclic traffic of the data transmission path in the telecommunications system; and
set the timing of their own cyclic traffic on the data transmission path between cyclic traffic detected based on the monitoring; and wherein
one or more of the devices are configured, during a second turn, to:
monitor the cyclic traffic on the data transmission path of the telecommunications system to determine on the basis of the monitoring and the cycle time of the at least one cycle of the cyclic traffic at least one expected occurrence time slot of the cyclic traffic; and
transmit a non-cyclic message that does not belong to the cyclic traffic to the data transmission path on the basis of at least one determined occurrence time slot of the cyclic traffic such that the message does not collide with one or more messages of the cyclic traffic which occur in the determined at least one occurrence time slot and the periodic nature of the cyclic traffic is maintained.

2. The arrangement of claim 1, wherein the second turn is arranged to start after the one or more first turns.

3. The arrangement of claim 1, wherein the devices are configured to start their turns gradually in terms of time, starting from a predetermined starting moment.

4. The arrangement of claim 1, wherein the devices are configured to notify the other devices that their turn has ended, and to start their own turn in response to such a notification from a device having a previous turn.

5. The arrangement of claim 1, wherein at least one of the devices is a router.

6. The arrangement of claim 1, wherein at least one of the devices is a switch.

7. A method for arranging traffic in a telecommunications system comprising a data transmission path and devices using the data transmission path for data transmission, data being transmitted on the data transmission path between the devices in messages cyclically according to at least one cycle having a substantially constant cycle time, the method comprising:
monitoring by one or more of the devices in turns during one or more first turns, respectively, the cyclic traffic of the data transmission path in the telecommunications system;
setting by one or more of the devices, during the respective one or more first turns the timing of the devices' own cyclic traffic on the data transmission path between cyclic traffic detected based on the monitoring by the device; and
determining by one or more of the devices, during a second turn, on the basis of the monitoring and the cycle time of the at least one cycle of the cyclic traffic at least one expected occurrence time slot of the cyclic traffic; and
transmitting by one or more of the devices during the second turn one or more non-cyclic messages that do not belong to the cyclic traffic from one or more devices to the data transmission path on the basis of at least one determined occurrence time slot of the cyclic traffic such that the messages do not collide with one or more messages of the cyclic traffic which occur in the determined at least one occurrence time slot and the periodic nature of the cyclic traffic is maintained.

8. The method of claim 7, wherein the second turn is carried out after the one or more first turns.

* * * * *